July 14, 1925.

J. T. GRAHAM

APPARATUS FOR MAKING ILLUMINATING GAS

Filed Dec. 21, 1922     6 Sheets-Sheet 1

Inventor,
J. T. Graham,
By his Attorneys,

July 14, 1925.
J. T. GRAHAM
1,545,755
APPARATUS FOR MAKING ILLUMINATING GAS
Filed Dec. 21, 1922     6 Sheets-Sheet 2
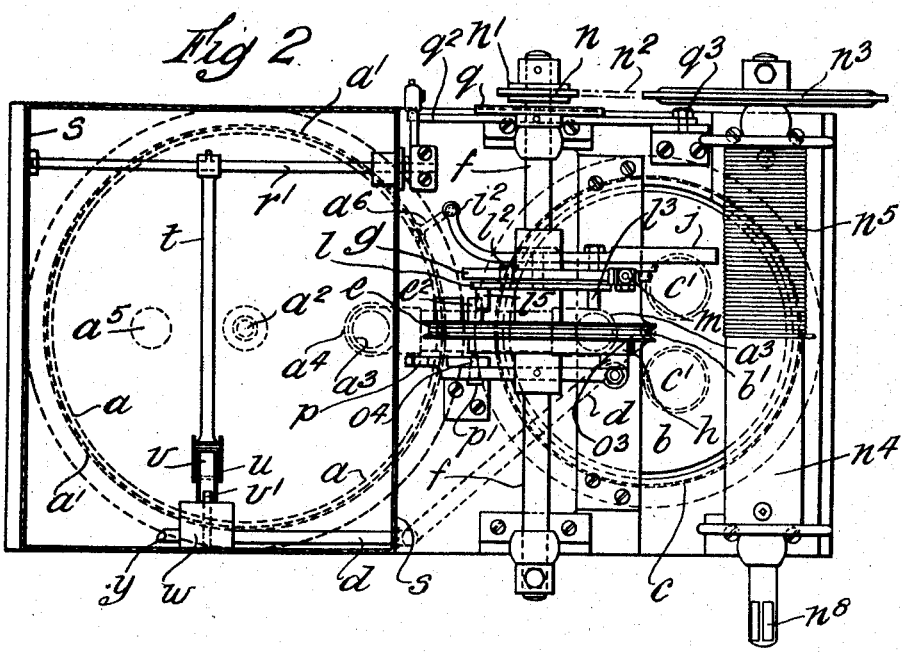
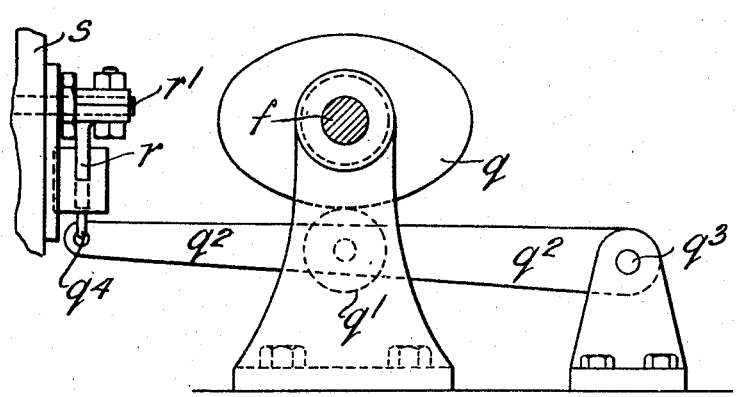
Inventor,
J.T.Graham,
By his Attorneys
Baldwin Wight July 14, 1925. 1,545,755

J. T. GRAHAM

APPARATUS FOR MAKING ILLUMINATING GAS

Filed Dec. 21, 1922 6 Sheets-Sheet 3

Inventor
J.T. Graham,
By his Attorneys,
Baldwin Wight

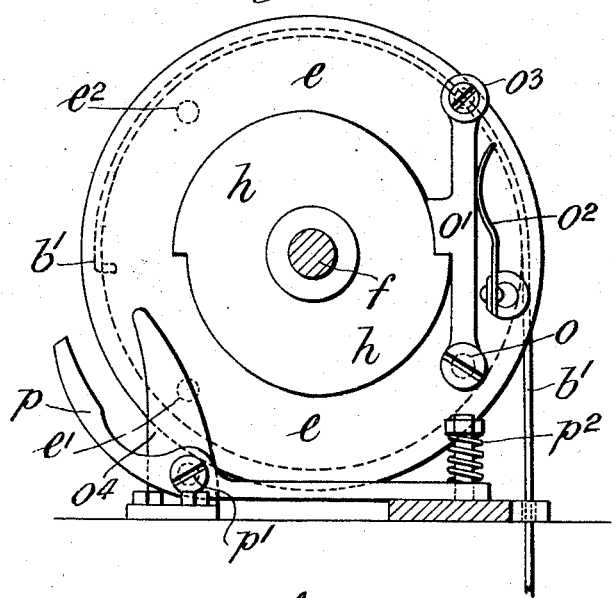
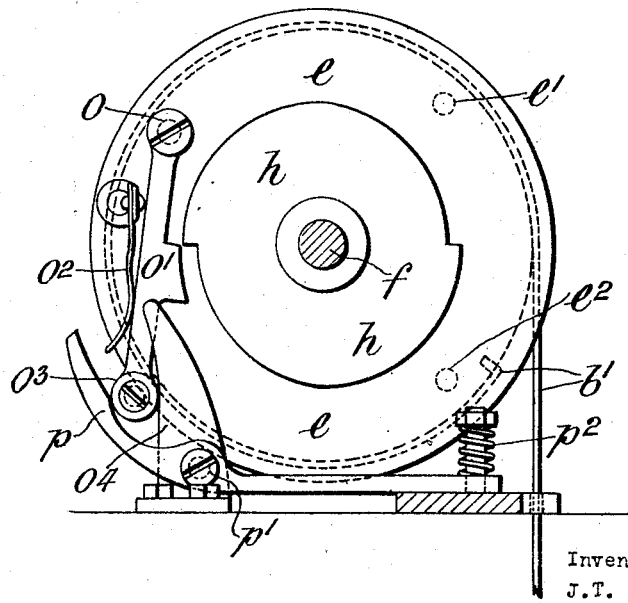

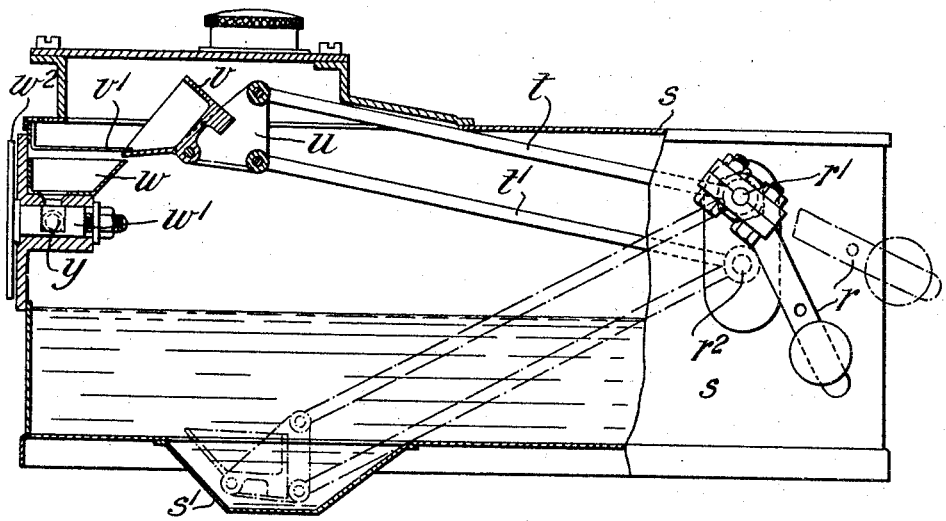
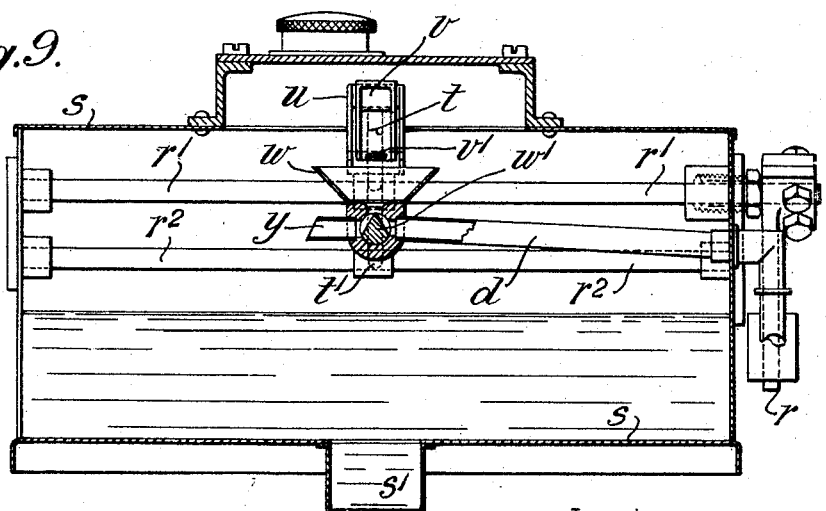

July 14, 1925.
J. T. GRAHAM
1,545,755
APPARATUS FOR MAKING ILLUMINATING GAS
Filed Dec. 21, 1922     6 Sheets-Sheet 6
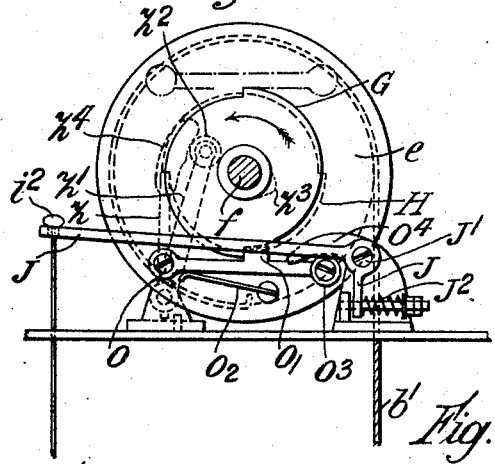
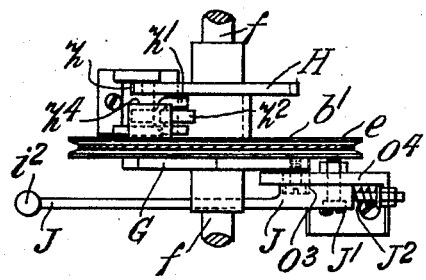
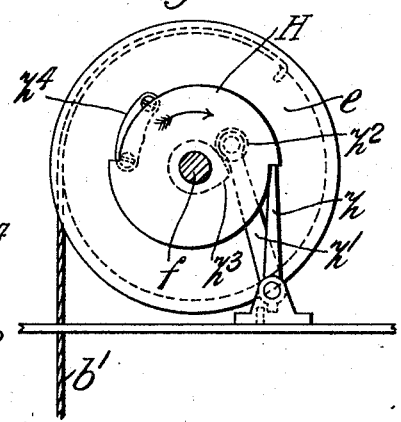
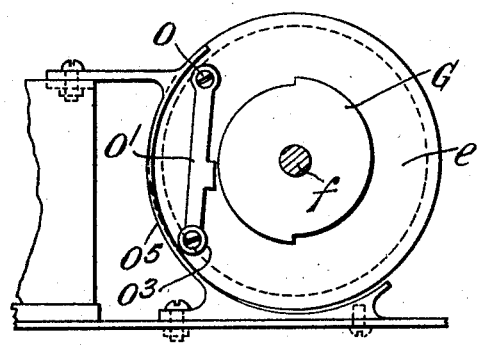
Inventor
J. T. Graham,
By his Attorneys Patented July 14, 1925.

1,545,755

UNITED STATES PATENT OFFICE.

JOHN THOMAS GRAHAM, OF HALSTEAD, ENGLAND, ASSIGNOR TO GEORGE KENT, LIMITED, OF LONDON, ENGLAND.

APPARATUS FOR MAKING ILLUMINATING GAS.

Application filed December 21, 1922. Serial No. 608,224.

*To all whom it may concern:*

Be it known that I, JOHN THOMAS GRAHAM, a subject of the King of Great Britain, residing at 13 Chapel Street, Halstead, Essex, England, have invented new and useful Improvements in Apparatus for Making Illuminating Gas, of which the following is a specification.

This invention relates to apparatus of the kind which is installed in country houses for making and supplying illuminating gas from air and gasolene or the like.

The object of this invention is to provide improved apparatus by which the rate at which the gas is made can be more readily controlled according to the rate at which it is consumed.

Figure 1:
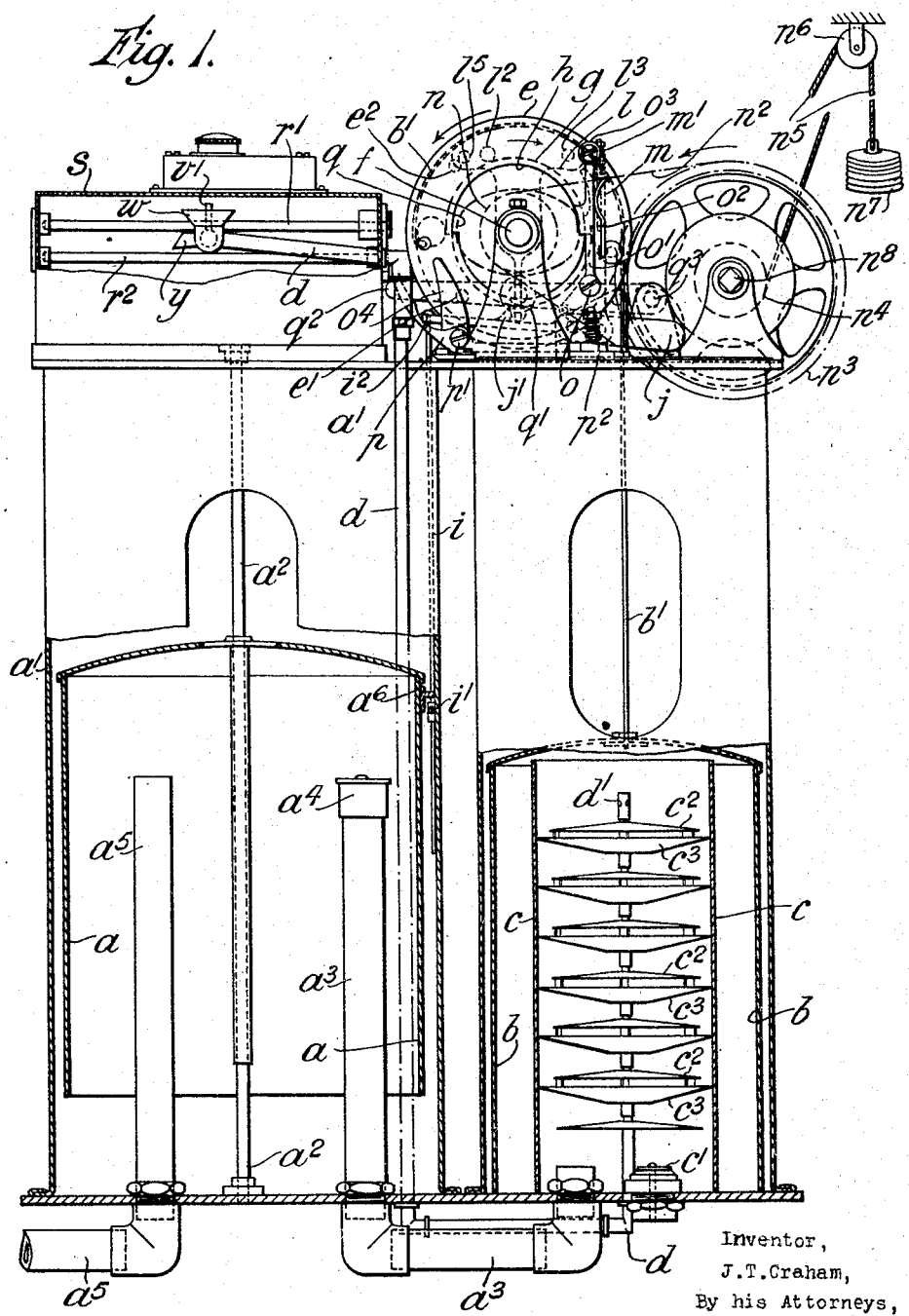

The invention is illustrated by the accompanying drawings, Figure 1 of which is a front elevation partly in section, Figure 2 is a plan, Figures 3, 4, 5 and 6, are vertical sections showing parts of the mechanism to a larger scale, Figure 7 shows the mechanism for actuating the mechanism delivering gasolene to the carburetter and Figures 8 and 9 are sectional elevations at right angles to one another of this delivery mechanism. Figure 10 is a part front view partly in section of a modified form, Figure 11 is a plan thereof, Figure 12 is a vertical section and Figure 13 a front view showing certain of the parts only.

$a$ is a gas holder which can rise and fall in a casing $a^1$, its movement being guided by a rod $a^2$. Into the interior of this holder carburetted air is delivered by a pipe $a^3$ having at its top end a non-return valve $a^4$ and from the holder gas passes through a supply pipe $a^5$. $b$ is a bell which encloses a carburetter $c$ into the bottom of which the pipe $a^3$ opens, and two valves $c^1$ are also provided at the bottom of the carburetter for admission of air. Gasolene is delivered to a pipe $d$ which passes up through the middle of the carburetter and has at its top orifices $d^1$ through which the gasolene falls on to the top of a series of cones $c^2$ over which it trickles and falls into a tray $c^3$ in the bottom of which are holes through which it falls on to the next cone $c^2$, and so on. When therefore the bell $b$ rises air passes in through the valve $c^1$ and ascending past this series of cones and trays becomes carburetted. The bell $b$ hangs from a rope $b^1$ which passes around and is fixed to a pulley $e$ loose on a shaft $f$ fast on which are two ratchets $g$ and $h$ each of which has two teeth. These two ratchets with their co-operating parts are shown in detail in Figures 3 to 6.

Figure 3:
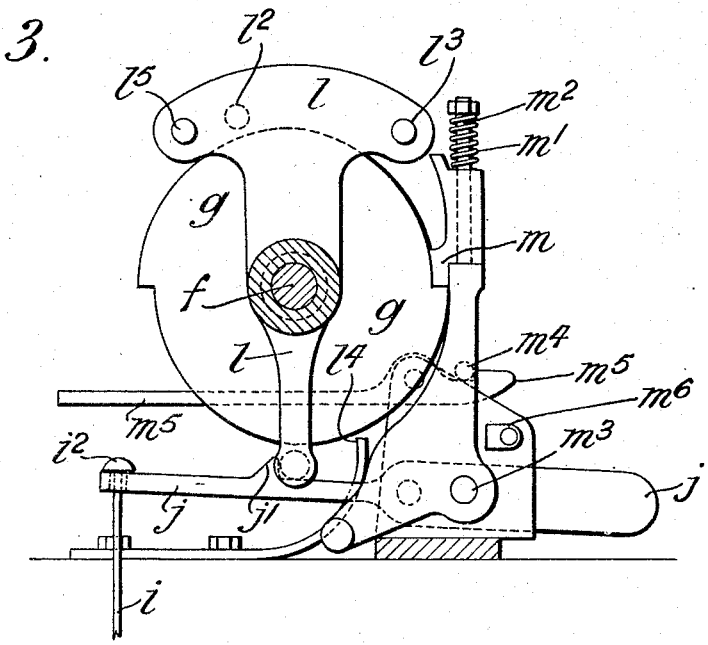
Figure 4:
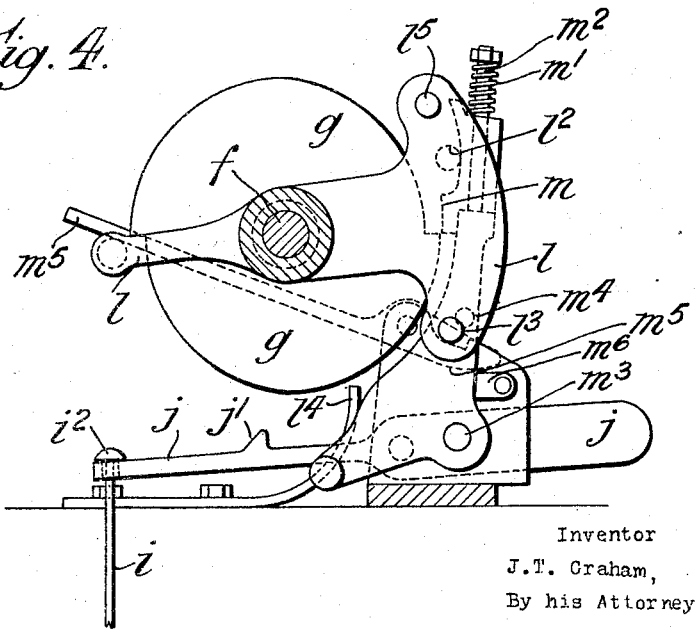

On the exterior of the gas holder $a$ is a projection $a^6$ which on the holder coming near to its lowest position strikes a lug $i^1$ on a rod $i$ the top of which carries a tappet $i^2$ so that as the bell falls this tappet is brought against the end of a weighted lever $j$ carrying a stop $j^1$ which is thus moved out of the way of the bottom end of a weighted quadrant $l$ free to turn about the axis of the shaft and so weighted that when the stop $j^1$ is withdrawn from it it will swing down in a clockwise direction, as seen in Figures 1, 3 and 4, so that a pin $l^2$ upon it will engage a detent $m$ capable of a sliding movement against a spring $m^1$ on a rod $m^2$ pivoted on a fixed pin $m^3$ and normally engaging one of the teeth of ratchet $g$. On the rear of shaft $f$ is a sprocket $n$ connected to the shaft through a free wheel device $n^1$ so that the sprocket when turned clockwise as seen in Figure 1 will not rotate the shaft but when turned anticlockwise will rotate the shaft. A chain $n^2$ passes over the sprocket and over a chain wheel $n^3$ fast with a drum $n^4$ around which is coiled a rope $n^5$ passing over a stationary pulley $n^6$ and having attached to it a weight $n^7$. The shaft of the drum has a squared end $n^8$ to which a crank handle can be attached so that the weight can be wound up once a day. It will be seen that the weight constantly tends to turn the shaft $f$ anticlockwise and that it can do so when the detent $m$ has been removed as just described.

In order to prevent accidental release of the detent $m$ a pin $m^4$ upon it is normally engaged by a pivoted safety catch $m^5$ the tail of which is raised by the bottom of the quadrant $l$ so that the catch is moved out of the way of the pin $m^4$ and frees the detent.

$m^6$ is a stop limiting the movement of the detent.

When the quadrant $l$ has thus fallen over and withdrawn the detent from engagement with ratchet $g$ the parts will be as shown in Figure 4.

Pivoted at $o$ on the pulley $e$ is a pawl $o^1$ which is normally pressed by a spring $o^2$ into engagement with one of the teeth of ratchet $h$. As therefore the shaft turns under the influence of the weight $n^7$ the ratchet $h$ will through its engagement with the pawl $o^1$ turn the pulley $e$ anticlockwise until a roller $o^3$ carried by the end of the pawl comes against a fixed finger $o^4$ by which the pawl will be turned on its pivot and thus be freed from the ratchet $h$. As the pawl is thus turned on its pivot the roller $o^3$ on the pawl comes against one end of a lever $p$ pivoted at $p^1$ and having its other end working against a spring $p^2$, so that the pulley will gradually be brought to rest. This movement raises the bell $b$ drawing in a fresh charge of air. As the pulley turns a pin $e^1$ projecting from its rear face comes against a pin $l^3$ projecting from the front face of the quadrant and moves the quadrant anticlockwise until its bottom end comes against a spring stop $l^4$ whereupon the quadrant comes to rest. This backward movement of the quadrant has of course freed detent $m$ the bottom of whose rod $m^2$ is so weighted that it turns back into position to engage the second tooth of ratchet $g$ so that the movement of the shaft is limited to half a revolution. When this tooth comes against the detent $m$ the shock is taken up by compression of the spring $m^1$.

Owing to its weight the bell $b$ gradually falls (which it can do since the pulley $e$ is loose on the shaft) and expels the carburetted air into the holder $a$ which therefore rises. This clockwise movement of the pulley brings a second pin $e^2$ against another pin $l^5$ on the quadrant as seen in Figure 5 and restores the quadrant to the position shown in Figure 3, so that the mechanism is ready to commence a fresh cycle of operations when the holder $a$ falls sufficiently low to actuate the tappet rod $i$.

On the shaft $f$ is fixed a cam $q$ bearing on a roller $q^1$ carried by an arm $q^2$ turning on a fixed pivot $q^3$. The end of this arm is connected by a link $q^4$ to an arm $r$ fast on a spindle $r^1$ journalled in a gasolene tank $s$. Fast on this spindle $r^1$ is an arm $t$ to the end of which is pivoted the top of a bucket cradle $u$ the bottom of which is pivoted to a second arm $t^1$ parallel and equal in length to the arm $t$ and pivoted to a second spindle $r^2$ also journalled in the tank, the arms $t$ and $t^1$ and the cradle forming a parallel motion. Normally the cradle lies in a well $s^1$ at the bottom of the tank as shown in dotted lines in Figure 8. When, however, the cam $q$ depresses the lever $q^2$ the arm $r$ is pulled down and the bucket cradle is raised to the position shown in full lines in Figure 8. To the front of the cradle is pivoted a bucket $v$. As the cradle rises the bucket brings up a charge of gasolene and its lip comes against a stop $v^1$ by which the bucket is tipped, as seen in Figure 8, to discharge its contents into a funnel $w$ in the outlet of which is a plug $w^1$ which can be set by a handle $w^2$. The middle part of the plug, that is, the part beneath the funnel outlet, is V-shaped, as seen in Figure 9, so that it divides the stream of gasolene issuing from the funnel to deliver more or less according to the setting of the plug to the pipe $d$ by which the gasolene is fed to the carburetter $c$, while the remainder of the gasolene discharged from the bucket flows back by a pipe $y$ into the tank. The setting of the plug will of course depend upon the richness of the gas which is desired.

The modified form illustrated in Figures 10 to 13 has been designed in order that the mechanism may be raised with the bell $b$ in its highest position instead of in its lowest position as was the case with the mechanism previously described. The pulley $e$ is as before loose on the shaft $f$ fast on which as before are ratchets G, H, each of which has two teeth, and means are provided which constantly tend to turn the shaft in the direction of the arrow in Figure 10. Pivoted at $o$ on the pulley $e$ is a pawl $o^1$ which is normally pressed by a spring $o^2$ into engagement with one of the teeth of ratchet G. This pawl carries a roller $o^3$ which in the position of rest lies underneath a fixed finger $o^4$ and also underneath a lever J pivoted at $J^1$ and acted upon by a spring $J^2$. The outer end of this arm J lies in the path of a tappet $i^2$ on a rod $i$. $z$ is a detent which normally engages one or other of the teeth of ratchet H. Fast with the detent $z$ is an arm $z^1$ carrying a roller $z^2$ which bears against a cam $z^3$ fast with the pulley $e$.

The action is as follows:—

On the descent of the gasometer the rod $i$ is pulled downwards as before; this depresses arm J against its spring $J^2$ and the arm pressing on the roller $o^3$ moves the pawl $o^1$ out of engagement with the ratchet G. The air bell therefore descends owing to its weight and the pulley $e$ moves clockwise carrying the pawl $o^1$ round with it until this pawl engages the other tooth of ratchet G as shown in dotted lines in Figure 1. As the pulley reaches this position the cam $z^3$ comes against the roller $z^2$ and rocks the arm $z^1$ and therefore the detent $z$ out of engagement with the ratchet H. The shaft $f$ therefore turns in the direction of the arrow, Figure 1, until the other tooth of ratchet H comes against the detent $z$ whereby the movement is arrested. As the shaft turns ratchet G engaging the pawl $o^1$ turns the pulley $e$ and raises the bell $b$ and the parts are restored to the positions in which they are shown in full lines in Figure 10.

If desired a guide or shield $o^5$ may be provided as shown in Figure 13 to ensure the correct movement of the pawl $o^1$.

Moreover, a guide or projection $z^4$ may be provided on the pulley e to ensure the engagement of the detent z with the teeth of ratchet H.

What I claim is:—

1. In apparatus for making illuminating gas from air and hydrocarbon which includes a gas holder, a carbureter and a bell surrounding the carbureter, the combination of a shaft, a pulley which is loose on the shaft and around which passes a rope attached to the bell, two ratchets fast on the shaft, means constantly tending to turn the shaft in a direction to raise the bell, means normally engaging one of the ratchets to prevent rotation of the shaft and means whereby the fall of the gas holder causes the ratchets to be released and permits the bell to be entirely raised by a half revolution of the shaft.

2. In apparatus for making illuminating gas from air and hydrocarbon which includes a gas holder, a carbureter and a bell surrounding the carbureter, the combination of a shaft, a pulley which is loose on the shaft and around which passes a rope attached to the bell, two ratchets fast on the shaft, means constantly tending to turn the shaft in a direction to raise the bell, means normally engaging one of the ratchets to prevent rotation of the shaft and means controlled by the fall of the gas holder alone for releasing the holding means and permitting the bell to be entirely raised by a half revolution of the shaft.

3. In apparatus for making illuminating gas from air and hydrocarbon which includes a gas holder, a carbureter and a bell surrounding the carbureter, the combination of a shaft, a pulley which is loose on the shaft and around which passes a rope attached to the bell, two ratchets fast on the shaft, means constantly tending to turn the shaft in a direction to raise the bell, means normally engaging one of the ratchets to prevent rotation of the shaft, means controlled by the fall of the gas holder alone for releasing the holding means and permitting the bell to be entirely raised by a half revolution of the shaft, and a pawl pivoted to the pulley and adapted to engage the teeth of one of the ratchets.

4. In apparatus for making illuminating gas from air and hydrocarbon which includes a gas holder, a carbureter and a bell surrounding the carbureter, the combination of a shaft, a pulley which is loose on the shaft and around which passes a rope attached to the bell, two ratchets fast on the shaft and each having two teeth, a pawl pivoted to the pulley and adapted to engage the teeth of one of the ratchets, means actuated by the descent of the gas holder alone for releasing the pawl from the ratchet, a detent adapted to engage the teeth of the other ratchet, means whereby the rotation of the pulley moves the detent out of engagement and means constantly tending to turn the shaft in a direction to raise the bell.

5. In apparatus for making illuminating gas from air and hydrocarbon which includes a gas holder, a carbureter and a bell surrounding the carbureter, the combination of a shaft, a pulley which is loose on the shaft and around which passes a rope attached to the bell, two ratchets fast on the shaft and each having two teeth, a pawl pivoted to the pulley and adapted to engage the teeth of one of the ratchets, a roller carried by the pawl, a pivoted arm adapted to press upon the roller and so to move the pawl out of engagement, means actuated by the descent of the gas holder alone for turning the arm on its pivot, a detent adapted to engage the teeth of the other ratchet, a cam carried by the pulley and adapted to move the detent out of engagement, and means constantly tending to turn the shaft in a direction to raise the bell.

In testimony that I claim the foregoing as my invention I have signed my name this 6th day of December, 1922.

JOHN THOMAS GRAHAM.